F. HELMICK.
ROLLER BEARING MINE CAR WHEEL.
APPLICATION FILED APR. 16, 1918.
1,270,155.
Patented June 18, 1918.
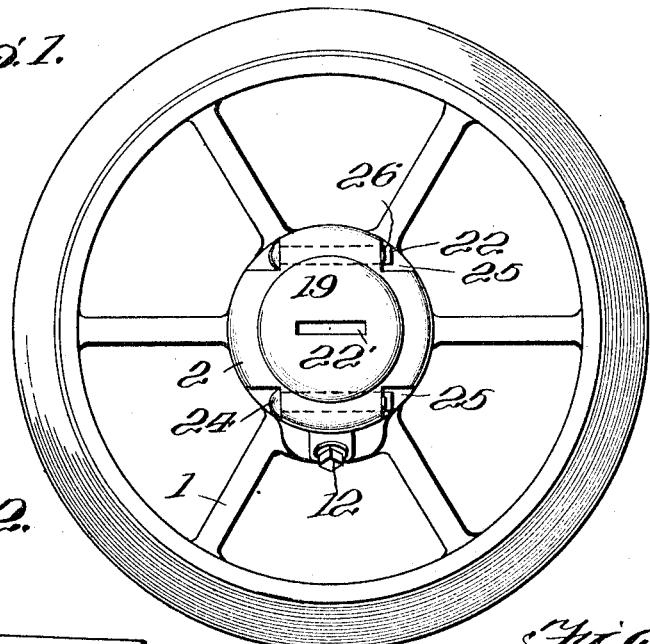
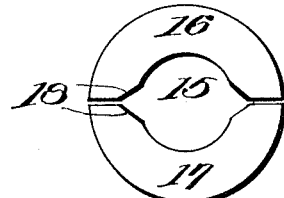
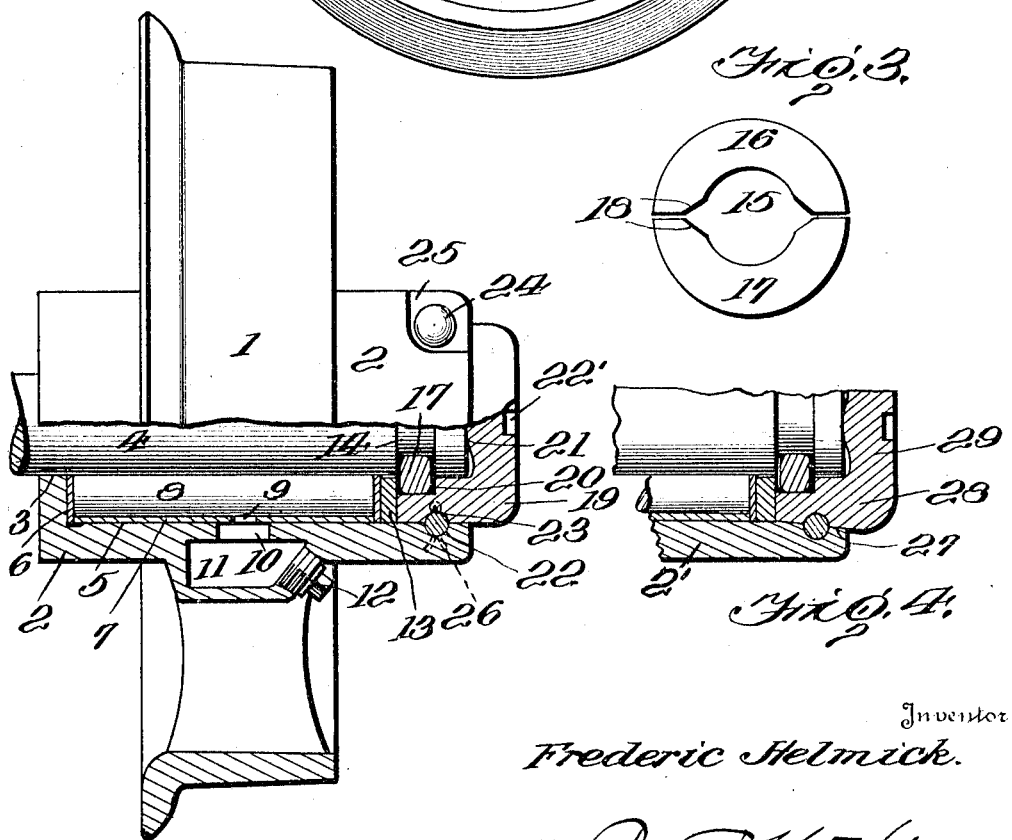
Inventor
Frederic Helmick.
By
Attorney

UNITED STATES PATENT OFFICE.

FREDERIC HELMICK, OF FAIRMONT, WEST VIRGINIA, ASSIGNOR TO HELMICK FOUNDRY MACHINE COMPANY, OF FAIRMONT, WEST VIRGINIA, A CORPORATION OF WEST VIRGINIA.

ROLLER-BEARING MINE-CAR WHEEL.

1,270,155.

Specification of Letters Patent.

Patented June 18, 1918.

Application filed April 16, 1918. Serial No. 228,934.

*To all whom it may concern:*

Be it known that I, FREDERIC HELMICK, a citizen of the United States, residing at Fairmont, in the county of Marion and State of West Virginia, have invented certain new and useful Improvements in Roller-Bearing Mine-Car Wheels, of which the following is a specification, reference being had therein to the accompanying drawing.

This invention relates to certain new and useful improvements in roller bearing mine car wheels and more particularly to means for attaching the same to the axle, the object being to provide a construction of wheel in which the hub cap is secured to the hub in such a manner as to practically form a one-piece wheel, as the hub and cap are secured together in such a manner that all play is eliminated.

Another object of my invention is to provide a novel form of locking ring formed in two parts and so mounted within the annular groove of the axle that the wheel will be securely fastened in position upon the hub.

Another object of my invention is to provide a construction of wheel in which the hub and hub cap provide a strong bearing for the axle, and means for preventing end thrust.

Other and further objects and advantages of the invention will be hereinafter set forth and the novel features thereof defined by the appended claims.

In the drawings,

Figure 1 is an elevation of my improved construction of roller bearing mine car wheel.

Fig. 2 is an elevation partly in section.

Fig. 3 is a plan view of the locking ring; and

Fig. 4 is a detail section of another form of hub cap.

Like numerals of reference refer to like parts in the several figures of the drawing.

In the drawing 1 indicates a wheel body which is provided with a hub 2 having a bore 3 to snugly receive an axle 4, said bore being annularly enlarged as shown at 5 to produce a shoulder 6 and an annular roller bearing chamber in which a tubular roller bearing cage 7 is mounted having the usual roller bearings 8 bearing against the axle 4. The tubular roller bearing cage 7 is provided with openings 9 registering with an annular groove 10 formed in the enlarged portion of the bore, said groove communicating with a grease reservoir 11 formed in the hub, which is provided with a plug closed inlet opening 12. By this construction lubricant can be forced through the opening into the reservoir from which it passes into the groove and is fed through the openings 9 to the roller bearings so as to thoroughly lubricate the same.

After the roller bearing cage has been inserted within the bore, a jam ring 13 is forced in the outer end of the bore against the end of the bearing cage so as to hold the opposite end of the cage against the shoulder 6. The axle 4 is formed with an annular groove 14 in which is placed a sectional locking ring 15 formed of two duplicate segmental sections 16 and 17, the corners of the segments being cut off at an angle as shown at 18, in order to facilitate the inserting of the locking ring within the annular groove of the axle 4.

A cup-shaped cap 19 which is turned to snugly fit the end of the bore 5 is then forced into the hub, said cap being annularly cut away, as shown at 20 to form a seat for the sectional locking ring 15, the inner end of the cap engaging the jam ring 13, as clearly shown in Fig. 2. It will be seen that by mounting the hub cap within the outer end of the bore in this manner all play is eliminated, and the hub cap forms means for holding the locking ring and the bearing cage in position within the hub. The inner face of the end of the cup-shaped cap 19 is formed convexed, as shown at 21, which engages the end of the axle 4 to prevent end thrust. The outer face of the hub cap is provided with a wrench receiving recess by means of which the cap can be turned so as to properly position the same within the hub in assembling the locking ring.

Extending tangentially through the hub are substantially semi-circular grooves 22 which register with substantially semi-circular grooves 23 formed tangentially in the hub cap, and through which locking pins 24 are adapted to extend, the hub being notched, as shown at 25, to form seats for the heads of the locking pins 24 and the cotter pins 26 carried by the opposite ends thereof. By securing the hub cap in position within the hub by tangentially arranged pins, which pass through openings formed by grooving the hub and cap, an extremely strong and durable locking means is provided which so unites the hub and cap that a practical one-piece wheel is formed in order to produce a solid outer end for the wheel.

In the form shown in Fig. 4, the hub 2' is constructed substantially the same as shown in Figs. 1 and 2 with the exception that the outer end of the bore is annularly enlarged, as shown at 27 to produce a conical portion to receive the tapering portion 28 of a hub cap 29, the hub and cap being secured together and to the axle in the identical same manner as shown in the preferred form. By this construction the cap can be driven into the end of the hub in order to obtain a wedging action so that an extremely tight fit is formed between the hub and cap.

From the foregoing description it will be seen that I have provided a roller bearing car wheel having novel means for holding the roller bearings in position and for attaching the wheel to the axle whereby a practical solid outer end for the wheel is provided.

I claim:

1. A car wheel having a hub provided with an opened outer end, a hub cap arranged within the outer end of said hub, said hub and cap having tangentially arranged registering grooves and pins extending through said grooves for locking said hub cap in position.

2. The combination with an axle having an annular groove, of a wheel provided with a hub having roller bearings mounted upon said axle, said hub having an opened outer end, a sectional locking ring arranged within the groove of said axle, a hub cap arranged within the outer end of said bore having a seat to receive the outer portion of said sectional ring, and means for locking said hub cap within the bore of said hub.

3. The combination with an axle having an annular groove at its outer end, of a wheel having a hub provided with a bore to receive said axle, said bore being enlarged to form a roller bearing chamber, a grease reservoir formed in said wheel, said bore having an annular groove communicating with said grease reservoir, a sectional locking ring arranged within the groove of said axle, and a hub cap secured within the end portion of said hub having a seat to receive said locking ring.

4. The combination with an axle having an annular groove, of a wheel having a hub provided with roller bearings mounted on said axle, said hub having an opened outer end, a jam ring arranged within the bore of said hub against the bearing therein, a sectional locking ring arranged within the groove of said axle, and a hub cap secured tightly within the bore of said hub having a seat for said locking ring.

5. A car wheel having a hub provided with a bore having an opened outer end, a hub cap fitted within the outer end of said bore, said hub cap having a seat for a locking ring, and bolts passing tangentially through said hub and cap for locking said hub cap within the bore of said hub.

6. A car wheel having a hub portion provided with a bore to snugly fit an axle at its inner end and enlarged to form a roller bearing space, said axle having an annular groove, a roller bearing cage arranged within said bore, a jam ring arranged within said bore against the end of said roller bearing cage, a locking ring arranged within the annular groove of said axle, a hub cap arranged within said bore having a seat to receive said locking ring, and provided with a portion engaging the jam ring and bolts for fastening said hub cap within the bore of said hub.

7. In a roller bearing mine car wheel, the combination with an axle having an annular groove at its outer end, of a car wheel provided with a hub having a bore at its inner end to snugly fit said axle and provided with an enlarged portion to receive a roller bearing cage, a jam ring arranged within said bore engaging said bearing cage, a sectional locking ring arranged within the groove of said axle, a hub cap fitted snugly within the outer end of said bore engaging said jam ring, said hub cap having a convexed portion engaging the end of the axle, an annular seat formed in said hub cap for said locking ring, and bolts passing tangentially through said hub and hub cap for locking said hub cap within said bore.

8. A car wheel having a hub provided with roller bearings and having an opened outer end, a hub cap fitted within the outer end of said hub, a seat formed in said hub cap for a locking ring for securing said wheel in position upon an axle, said hub cap and hub having registering tangentially arranged grooves and pins extending through openings formed by said registering grooves for locking said hub cap rigidly within the outer end of said hub.

In testimony whereof I hereunto affix my signature in the presence of two witnesses.

FREDERIC HELMICK.

Witnesses:
W. B. CROWL,
NELLE HOLLAND.